(12) United States Patent
Tan et al.

(10) Patent No.: US 8,384,615 B2
(45) Date of Patent: Feb. 26, 2013

(54) PORTABLE ELECTRONIC DEVICE

(75) Inventors: Chuan-Kang Tan, Shenzhen (CN); Jian-Hui Li, Shenzhen (CN); Shao-Hui Huang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 291 days.

(21) Appl. No.: 12/786,693

(22) Filed: May 25, 2010

(65) Prior Publication Data

US 2011/0074655 A1 Mar. 31, 2011

(30) Foreign Application Priority Data

Sep. 29, 2009 (CN) .......................... 2009 1 0307998

(51) Int. Cl.
*G09G 5/00* (2006.01)
*H04M 1/00* (2006.01)

(52) U.S. Cl. .......... 345/1.1; 345/1.2; 345/156; 345/168; 345/169; 345/173; 455/575.1; 455/575.8

(58) Field of Classification Search .... 455/556.1–556.2, 455/575.1, 575.3, 575.8; 345/1.1–1.3, 156, 345/158, 173–177
See application file for complete search history.

(56) References Cited

U.S. PATENT DOCUMENTS

| | | | | |
|---|---|---|---|---|
| 5,844,411 A | * | 12/1998 | Vogt | 324/537 |
| 6,144,358 A | * | 11/2000 | Narayanaswamy et al. | 345/102 |
| 6,445,574 B1 | * | 9/2002 | Saw et al. | 361/679.04 |
| 6,859,219 B1 | * | 2/2005 | Sall | 345/1.1 |
| 2003/0045245 A1 | * | 3/2003 | Hikishima | 455/90 |

* cited by examiner

*Primary Examiner* — Amr Awad
*Assistant Examiner* — Kenneth Bukowski
(74) *Attorney, Agent, or Firm* — Altis Law Group, Inc.

(57) ABSTRACT

A portable electronic device includes a main body and a cover rotatably mounted to the main body. The main body includes a central processing unit (CPU), a sensor, a first display, and a second display. The sensor, the first display, and the second display are connected to the CPU. The cover includes a third display connected to the CPU. The CPU detects the position of the cover relative to the main body using the sensor, switches the first display on when the cover is positioned at a first state, and switches the second display and the third display on when the cover is positioned at a second state.

8 Claims, 5 Drawing Sheets

PORTABLE ELECTRONIC DEVICE

BACKGROUND

1. Technical Field

The present disclosure relates to portable electronic devices, and particularly to a portable electronic device having multiple displays.

2. Description of Related Art

Currently, displays of portable electronic devices such as mobile phones, personal digital assistants (PDA) and laptop computers, are continuously being enlarged, such that the portable electronic devices can display images more clearly. However, enlarged displays may use a great deal of electric power.

Therefore, there is room for improvement within the art.

BRIEF DESCRIPTION OF THE DRAWINGS

Many aspects of the present portable electronic device can be better understood with reference to the following drawings. The components in the various drawings are not necessarily drawn to scale, the emphasis instead being placed upon clearly illustrating the principles of the present portable electronic device. Moreover, in the drawings, like reference numerals designate corresponding parts throughout the figures.

DETAILED DESCRIPTION

Figure 1:
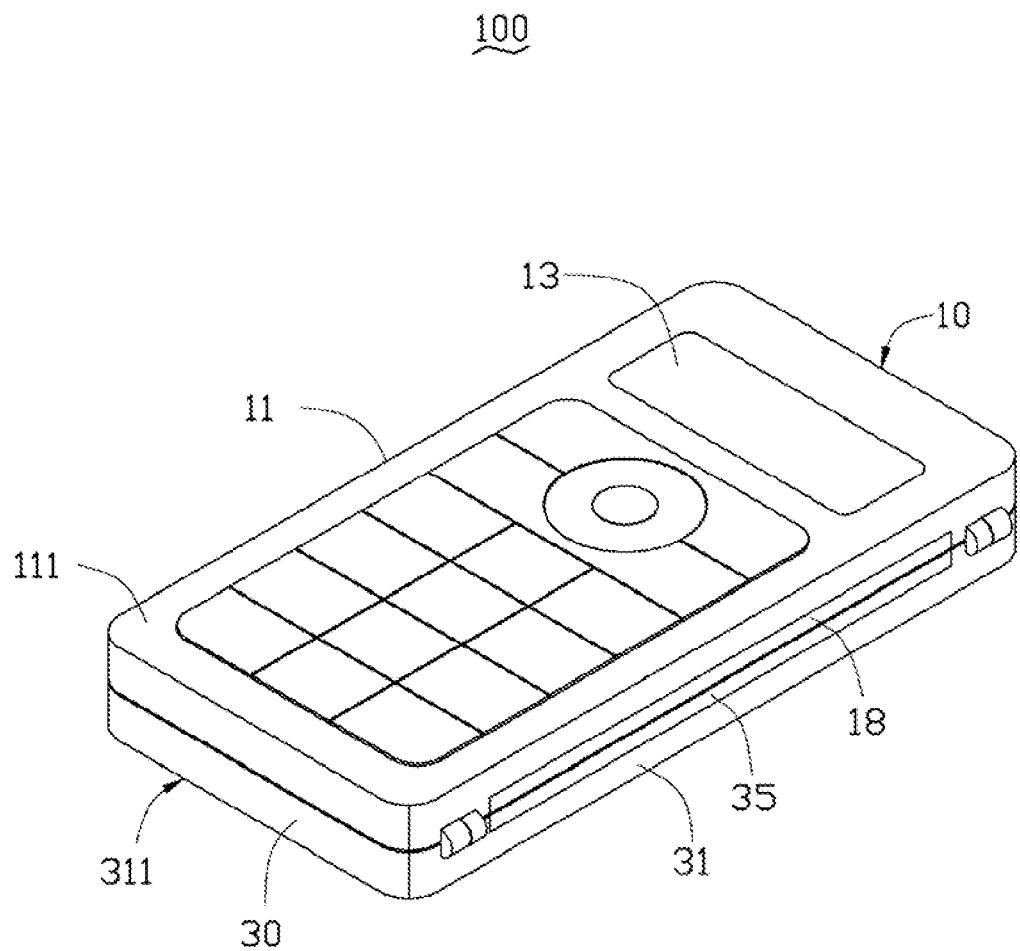
FIG. 1 is a schematic closed view of a portable electronic device, according to an exemplary embodiment.
Figure 2:
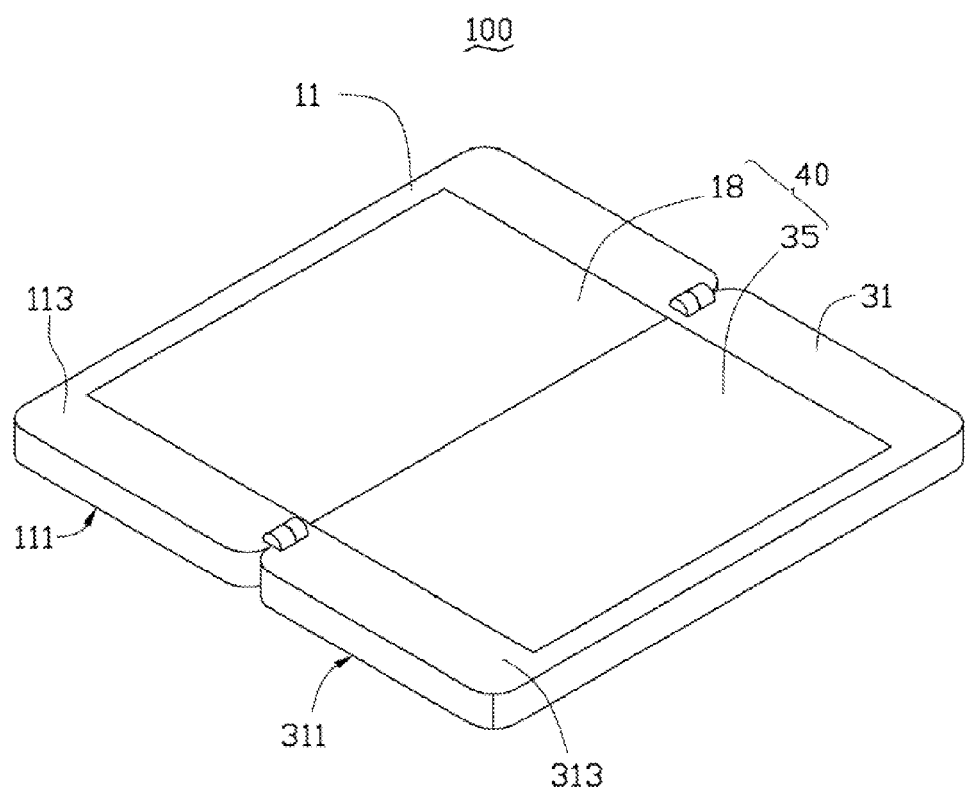
FIG. 2 is a schematic open view of the portable electronic device shown in FIG. 1.
Figure 3:
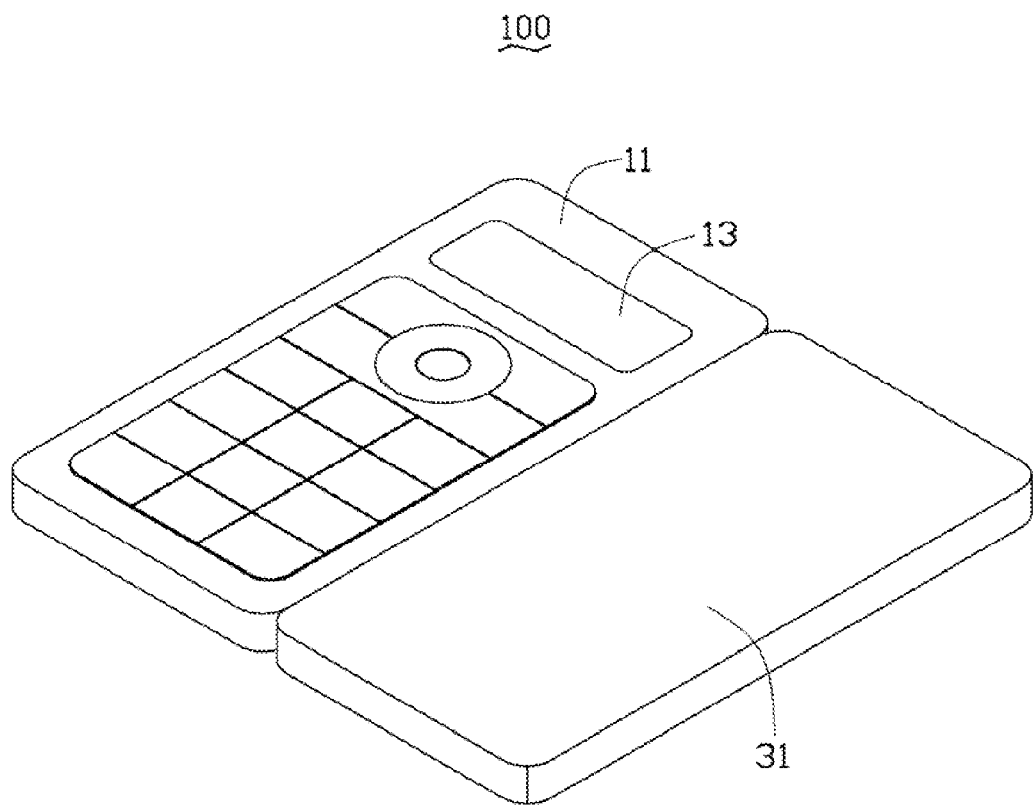
FIG. 3 is similar to FIG. 2, but shown in another direction.

FIGS. 1-3 schematically show a portable electronic device 100, according to an exemplary embodiment. The portable electronic device 100 can be a mobile phone, or a personal digital assistant (PDA), etc. The portable electronic device 100 includes a main body 10 and a cover 30. The cover 30 is rotatably mounted on the main body 10 and is electrically connected to the main body by conventional means, for example, with hinges (not labeled), and wires or flexible circuit boards (not shown) received in the hinges to electrically connect the cover 30 to the main body 10. Thus, the cover 30 can be rotated relative to the main body 10 to close or open the portable electronic device 100.

Figure 4:
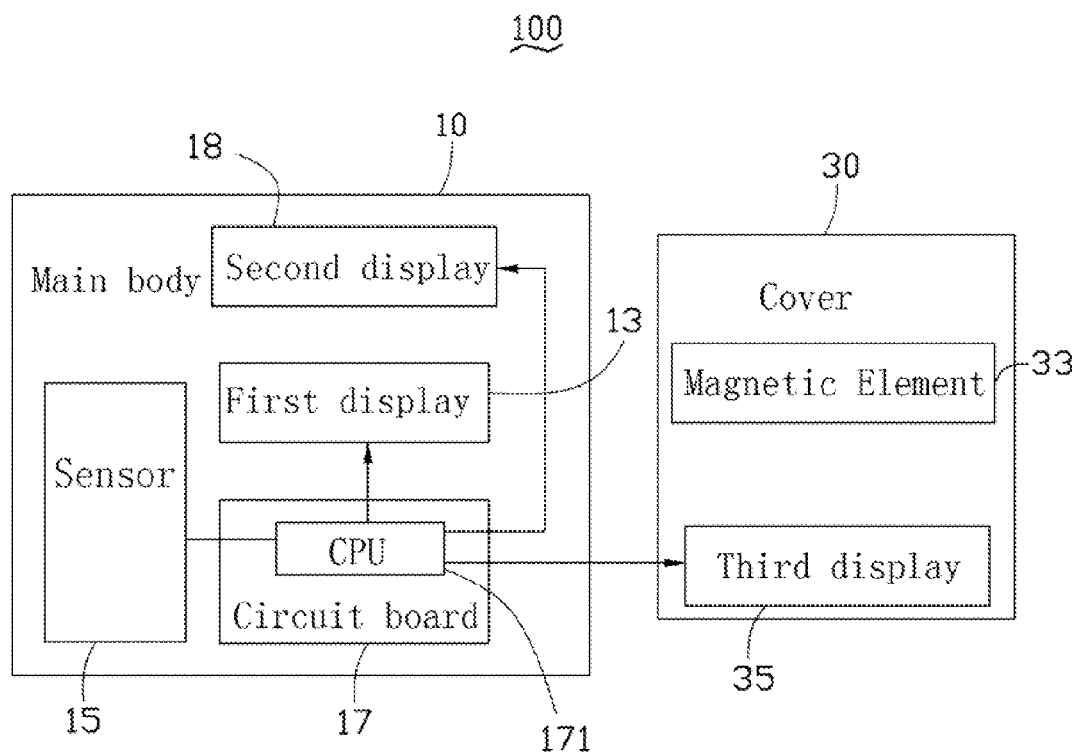
FIG. 4 is a block diagram of the portable electronic device shown in FIG. 1.
Figure 5:
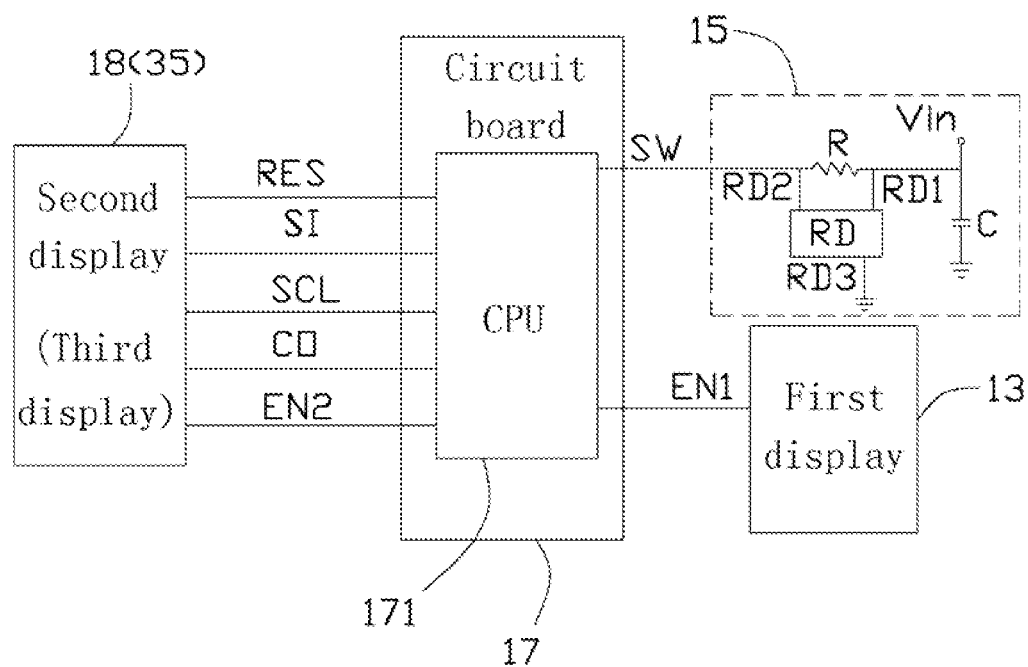
FIG. 5 is a circuit diagram of the portable electronic device shown in FIG. 1.

Also referring to FIG. 4 and FIG. 5, the main body 10 includes a first housing 11, a first display 13, a sensor 15, a circuit board 17, and a second display 18. The first housing 11 includes a first outer surface 111 and a first inner surface 113 positioned opposite to the first outer surface 111. The first display 13 is mounted on the first outer surface 111, and the second display 18 is mounted on the first inner surface 113. The size of the first display 13 is configured to be less than the area of the size of the second display 18, such that the first display 13 uses less electric power than the second display 18.

The sensor 15 and the circuit board 17 are received in the first housing 11. The sensor 15 is a Hall sensor, which includes a Hall element RD, a resistor R, and a capacitor C. The Hall element RD includes three connectors RD1, RD2, RD3. Two ends of the resistor R are respectively connected to the connectors RD1, RD2. The capacitor C has one pole connected to the connector RD1 and another pole grounded. The connector RD3 is grounded.

The circuit board 17 includes a central processing unit (CPU) 171 and other necessary circuits (not shown) of the portable electronic device 100. The CPU 171 includes a switch pin SW, a first enabling pin EN1, a reset pin RES, an image signal pin SI, a clock pin SCL, a second enabling pin EN2, and a control pin CO. The switch pin SW is connected to the connector RD2. The first enabling pin EN1 is connected to the first display 13 to enable the first display 13.

The cover 30 includes a second housing 31, a magnetic component 33, and a third display 35. The second housing 31 includes a second outer surface 311 and a second inner surface 313 positioned opposite to the first outer surface 311. The magnetic component 33 is received in the second housing 31, and the third display is mounted on the second inner surface 313. When the cover 30 covers the main body 10, the portable electronic device 100 is closed, the second inner surface 313 contacts the first inner surface 113, and the magnetic component 33 is positioned near to the Hall element RD such that the magnetic field applied to the Hall element RD by the magnetic component 33 can actuate the Hall element RD to switch on. When the cover 30 is rotated to the open position, the first inner surface 313 is exposed and the second inner surface 313 can be positioned adjacent and coplanar with the first inner surface 113, and the third display 35 and the second display 18 can be aligned with each other to cooperatively form a multiple display 40. When the portable electronic device 100 is opened, the magnetic component 33 is moved away from the Hall element RD, and the magnetic field applied to the Hall element RD by the magnetic component 33 decreases and is unable to actuate the Hall element RD to switch on.

The second display 18 and the third display 35 are connected to the CPU 171. Particularly, the second display 18 and the third display 35 are both connected to the CPU 171 by a same group of multiplex pins that includes the reset pin RES, the image signal pin SI, the clock pin SCL, the second enabling pin EN2, and the control pin CO. The CPU 171 can respectively send reset signals, image data, clock signals, and enabling signals to the second display 18 and the third display 35 through the reset pin RES, the image signal pin SI, the clock pin SCL, and the second enabling pin EN2, correspondingly. Additionally, the CPU 171 can also send instruction signals to the second display 18 and the third display 35 through the image signal pin SI, and send identifying signals to the second display 18 and the third display 35 through control pin CO, such that the second display 18 and the third display 35 can identify the kind of the signals sent from the image signal pin SI. In this way, when the second display 18 and the third display 35 cooperatively form the multiple display 40, the CPU 171 can synchronously control the second display 18 and the third display 35 to respectively display corresponding parts of a same image.

When the portable electronic device 100 is used, an electric potential Vin is applied to the first connector RD1 of the Hall element RD. The capacitor C filters alternating portions of the electric potential Vin, and the resistor R can limit the current generated by the electric potential Vin. Thus, the CPU 171 can detect the position of the cover 30 relative to the main body 10 using the Hall element 15 and the magnetic element 33, and selectively enable the first display 13 or the multiple display 40 according to the position of the cover 30.

When the portable electronic device 100 is closed, the magnetic element 33 is near to the Hall element RD, and the magnetic field of the magnet element 33 actuates the Hall element RD to switch on. The connector RD2 is then connected to the grounded connector RD3, and the voltage level on the connector RD2 becomes a relatively lower voltage level. The CPU 171 detects the relatively lower voltage level through the switch pin SW, and thus switches the first display 13 on through the first enabling pin EN1 and switches the second display 18 and the third display 35 off through the second enabling pin EN2.

When the portable electronic device 100 is open, the magnetic element 33 is moved away from the Hall element RD. Since the magnetic field applied to the Hall element RD by the magnet element 33 decreases and is unable to actuate the Hall element RD to switch on, the Hall element RD is switched off. The connector RD2 is separated from the grounded connector RD3, such that the voltage level on the connector RD2 becomes a relatively higher voltage level. The CPU 171 detects the relatively higher voltage level through the switch pin SW, and thus switches the first display 13 off through the first enabling pin EN1 and switches the second display 18 and the third display 35 on through the second enabling pin EN2. Thus, the second display 18 and the third display 35 can cooperatively form the multiple display 40 and respectively display corresponding parts of each displayed image.

In the present embodiment, the first display 13 having a smaller size and the multiple display 40 having a larger size can be selectively used. When the portable electronic device 100 is used to call or send messages, it can be closed and the first display 13 can be used to display images, thereby conserving electric power. When the portable electronic device 100 is used to play video files or play games, it can be opened and the multiple display 40 can be used to display images, thereby obtaining better display effect.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A portable electronic device, comprising:
a main body, the main body including a central processing unit (CPU), a sensor, a first display, and a second display; the sensor, the first display, and the second display being all electrically connected to the CPU; and
a cover rotatably mounted to the main body, the cover including a third display electrically connected to the CPU;
wherein the CPU detects the position of the cover relative to the main body using the sensor, and switches the first display on when the cover is positioned at a first state, and switches the second display and the third display on when the cover is positioned at a second state; and
wherein the CPU includes a plurality of pins, the sensor, the first display, the second display, and the third display are all electrically connected to the CPU by the pins, and both the second display and the third display are electrically connected to the CPU by a same group of pins selected from the plurality of pins; and
wherein the sensor includes a Hall element electrically connected to the CPU and the cover further includes a magnetic component; and the magnetic component is positioned relative to the sensor such that when the portable electronic device is closed the magnetic field applied to the Hall element by the magnetic component actuates the Hall element to switch on, and when the portable electronic device is opened the magnetic component is moved away from the Hall element such that the magnetic field applied to the Hall element by the magnetic component does not actuate the Hall element to switch on, the sensor respectively generates different voltage levels when it is respectively switched on and switched off, and the CPU detects the voltage levels generated by the sensor to identify the position of the cover, the sensor further includes a resistor and a capacitor, and the Hall element includes a first connector, a second connector, and a third connector; and when an electric potential is applied to the first connector, the resistor is electrically connected between the first connector and the second connector, the capacitor is electrically connected between the first connector and ground, and the third connector is grounded; and
wherein the plurality of pins includes a switch pin, a first enabling pin, a reset pin, an image signal pin, a clock pin, a second enabling pin, and a control pin; the switch pin is electrically connected to the second connector, and the CPU detects the voltage level on the second connector to identify the position of the cover; and the first enabling pin is electrically connected to the first display, and both the second display and the third display are electrically connected to the CPU by the reset pin, the image signal pin, the clock pin, the second enabling pin, and the control pin.

2. The portable electronic device as claimed in claim 1, wherein the first state is when the portable electronic device is closed and the second state is when the portable electronic device is opened; the cover is rotated relative to the main body to open or close the portable electronic device, and the CPU switches the first display on when the portable electronic device is closed and switches the second display and the third display on when the portable electronic device is opened.

3. The portable electronic device as claimed in claim 2, wherein the second display and the third display cooperatively form a multiple display and respectively display corresponding parts of a displayed image when the portable electronic device is opened.

4. The portable electronic device as claimed in claim 2, wherein the main body includes a first outer surface and an opposite first inner surface, and the cover includes a second outer surface and an opposite second inner surface; the first display is mounted on the first outer surface, the second display is mounted on the first inner surface, and the third display is mounted on the second inner surface; the second inner surface facing the first inner surface when the portable electronic device is closed; and the second inner surface positioned coplanar with the first inner surface and the second display and the third display being aligned with each other to form the multiple display when the portable electronic device is opened.

5. The portable electronic device as claimed in claim 1, wherein the CPU sends reset signals, image data, clock signals, and enabling signals to both the second display and the third display through the reset pin, the image signal pin, the clock pin, and the second enabling pin, correspondingly; and the CPU further sends instruction signals to both the second display and the third display through the image signal pin, and sends identifying signals to both the second display and the third display through the control pin, such that both the second display and the third display identify the kind of signals sent from the image signal pin.

6. A portable electronic device, comprising:

a main body, the main body including a central processing unit (CPU), a first display, and a second display; the first display and the second display both electrically connected to the CPU; and a cover rotatably mounted to the main body to close or open the portable electronic device, the cover including a third display electrically connected to the CPU;

wherein when the portable electronic device is closed the CPU switches the first display on, and when the portable electronic device is opened the CPU switches the second display and the third display on and controls the second display and the third display to form a multiple display and respectively display corresponding parts of a displayed image; and wherein the CPU includes a plurality of pins, the first display, the second display, and the third display are all electrically connected to the CPU by the pins, and both the second display and the third display are electrically connected to the CPU by a same group of pins selected from the plurality of pins; and wherein the main body further includes a sensor, and the CPU detects the position of the cover relative to the main body using the sensor to identify whether the portable electronic device is closed or opened, the sensor includes a Hall element electrically connected to the CPU and the cover further includes a magnetic element; and the magnetic component is positioned relative to the sensor such that the magnetic field applied to the Hall element by the magnetic component actuates the Hall element to switch on when the portable electronic device is closed, and the magnetic component is moved away from the Hall element such that the magnetic field applied to the Hall element by the magnetic component is unable to actuate the Hall element to switch on when the portable electronic device is opened, the sensor respectively generates different voltage levels when it is respectively switched on and switched off, and the CPU detects the voltage levels generated by the sensor to identify the position of the cover, the sensor further includes a resistor and a capacitor, and the Hall element includes a first connector, a second connector, and a third connector; and when an electric potential is applied to the first connector, the resistor is electrically connected between the first connector and the second connector, the capacitor is electrically connected between the first connector and ground, and the third connector is grounded; and wherein the plurality of pins includes a switch pin, a first enabling pin, a reset pin, an image signal pin, a clock pin, a second enabling pin, and a control pin; the switch pin is electrically connected to the second connector, and the CPU detects the voltage level on the second connector to identify the position of the cover; and the first enabling pin is electrically connected to the first display, and both the second display and the third display are electrically connected to the CPU by the reset pin, the image signal pin, the clock pin, the second enabling pin, and the control pin.

7. The portable electronic device as claimed in claim 6, wherein the main body includes a first outer surface and an opposite first inner surface, and the cover includes a second outer surface and an opposite second inner surface; the first display is mounted on the first outer surface, the second display is mounted on the first inner surface, and the third display is mounted on the second inner surface; the second inner surface facing the first inner surface when the portable electronic device is closed; and the second inner surface positioned coplanar with the first inner surface and the second display and the third display being aligned with each other to form the multiple display when the portable electronic device is opened.

8. The portable electronic device as claimed in claim 6, wherein the CPU sends reset signals, image data, clock signals, and enabling signals to both the second display and the third display through the reset pin, the image signal pin, the clock pin, and the second enabling pin, correspondingly; and the CPU further sends instruction signals to both the second display and the third display through the image signal pin, and sends identifying signals to both the second display and the third display through the control pin, such that both the second display and the third display identify the kind of signals sent from the image signal pin.

* * * * *